(12) United States Patent
Jain et al.

(10) Patent No.: US 6,592,651 B2
(45) Date of Patent: Jul. 15, 2003

(54) ACTIVATION PROCESSES FOR MONOLITH ADSORBENTS

(75) Inventors: Ravi Jain, Bridgewater, NJ (US); Sudhakar R. Jale, Scotch Plains, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 10/002,043

(22) Filed: Nov. 2, 2001

(65) Prior Publication Data

US 2003/0089230 A1 May 15, 2003

(51) Int. Cl.[7] .......................... B01D 53/02; B01J 20/30
(52) U.S. Cl. .................. 95/90; 95/900; 423/717; 502/400; 502/439; 502/514
(58) Field of Search .......................... 95/90, 130, 148, 95/900, 902, 903; 423/328.1, 328.2, 331, 700, 716, 717; 502/79, 400, 439, 514; 164/164.2, 181.6

(56) References Cited

U.S. PATENT DOCUMENTS

| | | | | |
|---|---|---|---|---|
| 2,882,244 A | * | 4/1959 | Milton | 208/2 |
| 4,518,704 A | * | 5/1985 | Okabayashi et al. | 156/89.25 |
| 4,631,267 A | * | 12/1986 | Lachman et al. | 502/263 |
| 5,464,467 A | * | 11/1995 | Fitch et al. | 423/328.2 |
| 5,565,394 A | * | 10/1996 | Lachman et al. | 502/64 |
| 5,580,369 A | | 12/1996 | Belding et al. | 96/125 |
| 5,633,217 A | * | 5/1997 | Lynn | 502/159 |
| 5,660,048 A | | 8/1997 | Belding et al. | 62/94 |
| 5,660,221 A | | 8/1997 | Oda et al. | 164/37 |
| 5,685,897 A | | 11/1997 | Belding et al. | 96/154 |
| 5,820,967 A | * | 10/1998 | Gadkaree | 264/176.1 |
| 5,972,835 A | | 10/1999 | Gupta | |
| 6,030,698 A | | 2/2000 | Burchell et al. | |
| 6,214,758 B1 | * | 4/2001 | Wu et al. | 502/60 |
| 6,409,801 B1 | * | 6/2002 | Shen et al. | 423/700 |
| 6,506,236 B2 | * | 1/2003 | Golden et al. | 95/129 |

FOREIGN PATENT DOCUMENTS

DE  41 40 455 A1  6/1993

OTHER PUBLICATIONS

Derwent Publications Ltd., XP–002229426, JP 57 056019 A, Daikin Kogyo KK, Apr. 3, 1982, *abstract*.

* cited by examiner

*Primary Examiner*—Duane Smith
*Assistant Examiner*—Frank M. Lawrence
(74) *Attorney, Agent, or Firm*—Philip H. Von Neida; Salvatore P. Pace

(57) ABSTRACT

An improved method for preparing monolith adsorbents and activating the adsorbents therein is disclosed. A mixture of lower temperature and higher temperature binders is used in fabricating the paper used to form the monolith structure. The finished monolith structure is heated to a temperature sufficient to remove the lower temperature binder while leaving the higher temperature binder to maintain integrity in the monolith.

3 Claims, No Drawings

ACTIVATION PROCESSES FOR MONOLITH ADSORBENTS

FIELD OF THE INVENTION

The present invention provides for processes for activating monolith adsorbents to remove the binders present in the monolith to improve kinetics while maintaining structural integrity. The treated monoliths of this invention are suited for enhanced gas and vapor separation operations.

BACKGROUND OF THE INVENTION

Cyclic adsorption processes are frequently used to separate the components of a gas mixture. Typically, cyclic adsorption processes are conducted in one or more adsorbent vessels that are packed with a particulate adsorbent material which adsorbs at least one gaseous component of the gas mixture more strongly than it adsorbs at least one other component of the mixture. The adsorption process comprises repeatedly performing a series of steps, the specific steps of the sequence depending upon the particular cyclic adsorption process being carried out.

In any cyclic adsorption process, the adsorbent bed has a finite capacity to adsorb a given gaseous component and, therefore, the adsorbent requires periodic regeneration to restore its adsorption capacity. The procedure followed for regenerating the adsorbent varies according to the process. In VSA processes, the adsorbent is at least partially regenerated by creating vacuum in the adsorption vessel, thereby causing adsorbed component to be desorbed from the adsorbent, whereas in PSA processes, the adsorbent is regenerated at atmospheric pressure. In both VSA and PSA processes, the adsorption step is carried out at a pressure higher than the desorption or regeneration pressure.

A typical VSA process generally comprises of a series of four basic steps that includes (i) pressurization of the bed to the required pressure, (ii) production of the product gas at required purity, (iii) evacuation of the bed to a certain minimum pressure, and (iv) purging the bed with product gas under vacuum conditions. In addition, a pressure equalization or bed balance step may also be present. This step basically minimizes vent losses and helps in improving process efficiency. The PSA process is similar but differs in that the bed is depressurized to atmospheric pressure and then purged with product gas at atmospheric pressure.

As mentioned above, the regeneration process includes a purge step during which a regeneration gas stream that is depleted in the component to be desorbed is passed countercurrently through the bed of adsorbent, thereby reducing the partial pressure of adsorbed component in the adsorption vessel which causes additional adsorbed component to be desorbed from the adsorbent. The non-adsorbed gas product may be used to purge the adsorbent beds since this gas is usually quite depleted in the adsorbed component of the feed gas mixture. It often requires a considerable quantity of purge gas to adequately regenerate the adsorbent. For example, it is not unusual to use half of the non-adsorbed product gas produced during the previous production step to restore the adsorbent to the desired extent. The purge gas requirement in both VSA and PSA processes are optimization parameters and depend on the specific design of the plant and within the purview of one having ordinary skill in the art of gas separation.

Many process improvements have been made to this simple cycle design in order to reduce power consumption, improve product recovery and purity, and increase product flow rate. These have included multi-bed processes, single-column rapid pressure swing adsorption and, more recently, piston-driven rapid pressure swing adsorption and radial flow rapid pressure swing adsorption. The trend toward shorter cycle times is driven by the desire to design more compact processes with lower capital costs and lower power requirements. The objective has been to develop an adsorbent configuration that demonstrates a low pressure drop, a fast cycle time and an ability to produce products such as oxygen.

Honeycomb structured monoliths, which are normally made by high temperature treatment of a mixture of binder, additives and catalyst or adsorbent materials are suitable for fast cycle sorption processes. These monoliths, either in the form of one single block or in the form of extrudates with multiple random channels, exhibit unique features of low pressure drop, good mechanical properties and freedom from attrition and fluidization problems of conventional catalysts and adsorbents. These types of monoliths have historically been employed as catalyst supports in automobile catalytic converters, catalytic combustion, electrochemical reactors and biochemical reactors. These monoliths, however, have very low loading of active catalyst or adsorbent and not all of the adsorbent or catalyst material is accessible to the gas molecules passing through them.

Monoliths, however, that are made from paper like sheets containing polymeric fibers as described in U.S. Pat. Nos. 5,660,048; 5,660,221; 5,685,897; and 5,580,369, exhibit very high loading of adsorbent material. Active adsorbent materials such as zeolites, carbon molecular sieve (CMS), alumina and other porous adsorbent materials can be embedded in the paper during the manufacturing process. In order to bind adsorbent particles with fibers and to have uniform distribution of adsorbent particles, many ingredients and additives may also be added into the slurry during the sheet manufacturing. Normally, the non-woven-fabric sheet (paper), which will be shaped into the monolith in later stages, comprises fibers such as polyaramids, one or more binders such as acrylic latex, a retention aid and active adsorbent materials. A retention aid is any material that enhances the retention of very small fibers and adsorbents.

The binder is added to the slurry to bind the adsorbent particles to the fibers. Through this process, adsorbent/catalyst particles tend also to be encapsulated by the polymeric binder material. The adsorbent containing monoliths or sheets need to be activated at high temperatures to desorb water or other sorbed species from their active sites. The temperature at which the activation is undertaken is dependent on the nature of the adsorbent material. As described in U.S. Pat. No. 5,580,369, this activation is typically performed at temperatures below the decomposition temperature of the binder. This degree of activation is sufficient, if the adsorbate molecules can diffuse through the binder layer to reach the adsorbent/catalyst. It has been demonstrated that such an activation below the temperature of binder decomposition works well in dehumidification applications, where the diffusivity or solubility of water through the binder is high and adsorbent does not need higher temperature activation. However, it has been found in the current invention that in certain types of applications such as the adsorption of $N_2$ from air, the binder layer typically provides a kinetic barrier to adsorbate molecules from reaching the adsorbent particles. When this happens, the resulting monolith has poor kinetic performance for gas adsorption and desorption, which results in poor PSA/VSA performance in gas separation processes.

The present inventors have discovered that using two binders in the sheet making process and removing one of them during monolith activation, will provide for a better performing adsorbent monolith.

SUMMARY OF THE INVENTION

The present invention provides for a method for removing binders from monolith adsorbents. This method utilizes a combination of two binders one of which decomposes at a lower temperature than the other in the handsheets used to prepare the monolith adsorbents. After decomposing the lower temperature binder, the higher temperature binder remains and adds structural integrity to the final formed monolith. The heat used to decompose the lower temperature binders also activates the adsorbent material contained in the monolith.

The present invention also provides for a method for separating a first gaseous component from a gas mixture by passing the gas mixture into an adsorption zone containing a monolith adsorbent that has been treated by heating to a temperature sufficient to decompose the lower temperature binders therein, thereby separating the first gaseous component from the gas mixture and recovering the first gaseous component.

DETAILED DESCRIPTION OF THE INVENTION

The present invention provides for a method for removing lower temperature binders from a formed monolith structure while activating the adsorbent contained in said monolith comprising heating said monolith to a temperature sufficient to remove substantially all of said lower temperature binder.

The present invention also provides for a method for fabricating a monolith adsorbent structure comprising the steps of: forming a slurry comprising water, fiber, adsorbent, retention aid and lower temperature and higher temperature binders; forming paper from said slurry; forming a monolith adsorbent structure from said paper; and heating said monolith adsorbent structure in the flow of a gas to a temperature sufficient to remove substantially all of said lower temperature binder.

For purposes of the present invention, lower temperature binder is defined as a binder which decomposes at a lower temperature than the higher temperature binder. The difference in the decomposition temperatures can be as low as 25° C. and could be as high as several hundred degrees.

Some of the lower temperature binders that can be employed in the methods of the present invention include but are not limited to polyurethanes, polyethylene glycols (PEG), polyvinyl alcohols, and acrylic latexes such as butadiene-acrylonitrile copolymers. These binders decompose at temperatures below 400° C. (acrylic latexes) and below 325° C. (polyethylene glycols and polyvinyl alcohols).

The higher temperature binders that can be employed in the methods of the present invention include but are not limited to silica, various clays, amorphous aluminosilicates, and acrylic latexes such as butadiene-acrylonitrile copolymers. Except for acrylic latexes which decomposes at or below 400° C. the inorganic binders are stable at temperatures much higher than 450° C.

A particular binder can change from lower temperature binder to higher temperature binder and vice versa depending on the other binder used in the handsheet making process. In combination with polyvinyl alcohols and polyethylene glycols acrylic latex is a higher temperature binder since its decomposition temperature is higher than polyvinyl alcohols and polyethylene glycols. However, in combination with silica and clays it is a lower temperature binder since it can decompose at lower temperatures than silica and clays. When an organic binder such as an acrylic latex or polyethylene glycol is used with an inorganic binder, temperatures as high as 450° C. can be used for complete removal of the organic binder and adsorbent activation.

The fibers that are employed in manufacturing the paper sheets can be synthetic or natural and can be either organic or inorganic. The synthetic organic polymeric fibers that can be used include but are not limited to polyaramids, polyamides, polyesters, polyvinyl chlorides, nylons, acrylics, polyethylenes, polypropylenes, acrylonitrile homopolymers, copolymers with halogenated monomers, styrene copolymers, and mixtures of polymers (i.e., polypropylene with low density polyethylene and high density polyethylene with styrene). The inorganic fibers include but are not limited to glass, metal fibers and rock wool. Natural fibers include wood pulp such as cellulose. Combinations of organic and inorganic fibers can also be employed. Fibrillated fibers, such as those described in U.S. Pat. No. 5,685,897, may also be employed in making the sheets.

The monolith adsorbent structure when formed may take on any design and shape for use in gas separation processes. The formed monolith structure will contain an adsorbent material which includes but is not limited to zeolite type X, zeolite type A, zeolite type Y, ZSM-3, EMT, EMC-2, ZSM-18, ZK5, ZSM-5, ZSM-11, β, L, chabazite, offretite, erionite, mordenite, gmelinite, mazzite, and mixtures of these. Sodium forms of these zeolites with substantially all of the charge-compensating cations in sodium form can also be used. Further preferred compositions include X and A zeolites with Si/Al ratio of 1.0 containing substantially all of the charge-compensating cations in sodium form. Other adsorbents such as activated alumina, silica gel, carbon molecular sieves, amorphous aluminosilicate and clay materials can also be used. Although various cationic forms of zeolites can be chosen, preferred zeolites include type X zeolites, type A zeolites and mordenites. For certain processes such as oxygen VSA, further preferred embodiments of type A zeolites, type X zeolites and mordenites include adsorbents containing lithium, lithium and bivalent cations, or lithium and trivalent cations with Si/Al molar ratio of 0.9 to 1.25, preferably 1.0 to 1.1, and most preferably with an Si/Al ratio of less than 1.08. Also for lithium containing X zeolites, lithium content is greater than 50% of total charge-compensating cations and more preferably greater than 75% of the total charge-compensating cations.

The percent ratio of low temperature binder to high temperature binder on a weight/weight ratio ranges from about 50:50 to about 95:5. This ratio will vary, of course, over the weight ranges stated due to conditions such as type of binders used, temperature of activation and other components in the sheets used to make the monolith.

A gas such as air, nitrogen, nitrous oxide or argon can be used for monolith activation and binder decomposition. Nitrogen and argon containing small amounts of oxygen can also be used.

The temperature to which the monolith will be heated will vary depending upon the types of lower temperature and higher temperature binders present in the monolith. For purposes of the present invention, the monolith may be heated to temperatures of around 450° C. or less. This will remove substantially all of the low temperature binder while leaving the high temperature binder present in the sheets used to form the monolith.

In the adsorption process embodiment of the invention, a component of a gas mixture that is more strongly adsorbed than other components of the gas mixture is separated from the other components by contacting the gas mixture with the adsorbent under conditions which effect adsorption of the strongly adsorbed component. Preferred adsorption processes include PSA including vacuum swing adsorption (VSA), TSA and combinations of these.

The temperature at which the adsorption step of the adsorption process is carried out depends upon a number of factors, such as the particular gases being separated, the particular adsorbent being used, and the pressure at which the adsorption is carried out. In general, the adsorption step of the process is carried out at a temperature of at least about $-190°$ C., preferably at a temperature of at least about $-20°$ C., and most preferably at a temperature of at least about $0°$ C. The upper temperature limit at which the adsorption step of the process is carried out is generally about $500°$ C., and the adsorption step is preferably carried out at temperatures not greater than about $70°$ C., and most preferably carried out at temperatures not greater than about $50°$ C.

The adsorption step of the process of the invention can be carried out at any of the usual and well known pressures employed for gas phase temperature swing adsorption and pressure swing adsorption processes. Typically the minimum absolute pressure at which the adsorption step is carried out is generally about 0.7 bara (bar absolute), preferably about 0.8 bara and most preferably about 0.9 bara. The adsorption can be carried out at pressures as high as 50 bara or more, but is preferably carried out at absolute pressures not greater than about 20 bara, and most preferably not greater than about 10 bar.

When the adsorption process is PSA or VSA, the pressure during the regeneration step is reduced, usually to an absolute pressure in the range of about 0.1 to about 5 bara, and preferably to an absolute pressure in the range of about 0.175 to about 2 bara, and most preferably to an absolute pressure in the range of about 0.2 to about 1.1 bara.

As indicated above, the process of the invention can be used to separate any two gases, provided that one of the gases is more strongly adsorbed by the adsorbents of the invention than is the other gas under either conditions of equilibrium or non-equilibrium, i.e., in the kinetic regime of a process. The process is particularly suitable for separating nitrogen from oxygen, nitrogen and argon from oxygen, carbon dioxide from air, dinitrogen oxide from air and for the separation of hydrocarbons, for example, the separation of alkenes, such as ethylene, propylene, etc., from alkanes, such as ethane, propane, etc., and the separation of straight-chain hydrocarbons from branched-chain hydrocarbons, e.g., the separation of n-butane from i-butane. Type A zeolites with appropriate cation compositions are particularly suitable for the separation of alkenes from alkanes, n-alkanes from i-alkanes and carbon dioxide from alkanes, alkenes and acetylene. The separation of these gases is preferably carried out at ambient temperature or higher, although the separation of nitrogen, oxygen and argon can be carried out at cryogenic temperatures.

It will be appreciated that it is within the scope of the present invention to utilize conventional equipment to monitor and automatically regulate the flow of gases within the system so that it can be fully automated to run continuously in an efficient manner.

The invention is further illustrated by the following examples in which, unless otherwise indicated, parts, percentages and ratios are on a weight basis.

EXAMPLE 1

Lithium and rare-earth containing LSX (LiRELSX) sample was made as disclosed in the EXAMPLE 1 of U.S. Pat. No. 5,464,467.

EXAMPLES 2–8

A slurry was made by blending 1.0 g polyaramid fiber to the 700 ml of deionized (DI) water. 3.5 g LiRELSX zeolite as prepared in EXAMPLE 1 was then added to the above slurry under stirring. A retention aid and binders were added to the slurry allowing fibers and adsorbent materials to bind together. In Examples 2–8, handsheets were prepared using different combinations of binders and a retention aid. The quantity of retention aid and binders are presented in TABLE 1. In Table 1, the inorganic binders are colloidal silica (HS-40) and clays (attapulgite and kaolin). These binders are available from companies such as Aldrich and Engelhard. The lower temperature binder.is the acrylic latex and is available from companies such as BF Goodrich and BASF. The stock preparation was carried out using deionized water at $50°$ C. The stock was poured into the handsheet mold and water was drained by gravitational forces. The sheet thus formed was pressed by roller press to remove additional water. The sheet was then dried at $100°$ C. for about one hour.

TABLE 1

Amount of retention aid and binders in Examples 2-8.

| Example | Inorganic binder | Retention Aid wt., g | Organic (Acrylic Latex) Binder wt., g | Inorganic Binder, wt., g |
| --- | --- | --- | --- | --- |
| 2 | none | 0.04 | 0.44 | 0.00 |
| 3 | HS-40 | 0.04 | 0.25 | 0.41 |
| 4 | HS-40 | 0.06 | 0.00 | 0.88 |
| 5 | Attapulgite | 0.04 | 0.25 | 0.20 |
| 6 | Attapulgite | 0.04 | 0.00 | 0.20 |
| 7 | Kaolin | 0.04 | 0.25 | 0.20 |
| 8 | Kaolin | 0.04 | 0.00 | 0.20 |

EXAMPLE 9

Adsorption isotherms of nitrogen ($N_2$) and oxygen ($O_2$) on the products of Examples 2–8 were measured gravimetrically using Cahn 2000 Series microbalance enclosed in a stainless steel vacuum/pressure system. The handsheets obtained from Examples 2–8 were first activated at $400°$ C. for 10 hours in the flow of nitrogen in an external oven before the adsorption measurements. The physical examination of the handsheets showed that the sheets prepared with inorganic binder had better strength than the ones prepared with only organic binder. When the handsheet containing only organic binder was activated at $400°$ C., most of the binder was decomposed resulting in a dusty sheet. However, when inorganic binder was present in the sheet, it helped bind the zeolite powder to the fiber and it did not decompose like the organic binder.

The activated sheets were cut into small pieces of 10×3 mm length to place in the aluminum bucket, which was connected to the Cahn microbalance. About 100 mg of samples were carefully evacuated and the temperature was increased to $400°$ C. at a rate of $1°-2°$ C. per minute. The adsorption isotherms for nitrogen and oxygen. were measured at $25°$ C. in the pressure range 20–6900 mbar for nitrogen and 20–2000 mbar for oxygen and the data fitted to multiple and single site Langmuir Isotherm Model, respectively. The fits to the nitrogen data were used to calculate the effective capacity for nitrogen at 25° C. and $N_2/O_2$ selectivities. The effective nitrogen capacity defined as the difference between the nitrogen capacity at 1000 mbar and that at 300 mbar gives a good indication of the capacity of the adsorbent in a PSA process operated between upper and lower pressures in this range. The selectivities of the samples for nitrogen over oxygen in air at 300 and 1000 mbar and 25° C. were derived from the pure gas isotherms for nitrogen and oxygen using Langmuir mixing rules (Ref. e.g. A. L. Myers: AlChE: 29(4), (1983), p691–693). The usual definition for selectivity was used, where the selectivity (S) is given by:

$$S=(X_{N2}/Y_{N2})/(X_{O2}/Y_{O2})$$

where $X_{N2}$ and $X_{O2}$ are the mole fractions of nitrogen and oxygen, respectively, in the adsorbed phases, and $Y_{N2}$ and $Y_{O2}$ are the mole fractions of nitrogen and oxygen, respectively, in the gas phase. The adsorption results for the samples from Examples 2–8 are given in Table 2. Table 2 shows that the $N_2/O_2$ selectivities approaching those of zeolite powder (Example 1) can be obtained in the monoliths of this invention.

TABLE 2

Adsorption capacities of LiRELSX powder (Example 1) and the handsheets from Examples 2–8

| EXAMPLE NO. | Effective $N_2$ capacity mmol/g zeolite | $N_2/O_2$ selectivity 1000 mbar | 300 mbar |
| --- | --- | --- | --- |
| 1 | 0.589 | 6.1 | 9.3 |
| 2 | 0.568 | 5.6 | 8.3 |
| 3 | 0.542 | 5.0 | 7.0 |
| 4 | 0.593 | 6.3 | 8.9 |
| 5 | 0.530 | 5.7 | 8.3 |
| 6 | 0.565 | 5.8 | 8.5 |
| 7 | 0.552 | 5.8 | 8.5 |
| 8 | 0.520 | 6.3 | 9.0 |

EXAMPLE 9

Thermogravimetric analysis (TGA) measurements were carried out on Perkin Elmer Thermogravimetric Analyzer TGA7 in the flow of air with a flow rate of 2 liters per min. The temperature was raised at the rate of 2° C. per min to 1000° C. LiRELSX and the handsheet prepared with only inorganic binder had similar shaped TGA plots. The handsheet prepared with organic binder clearly exhibited three steps. The weight loss up to 200° C. temperature was due to water loss, the second one around 350° C. can be attributed to the decomposition of combination of retention aid and binder, and the third step at about 525° C. was due to the decomposition of fiber. This was further confirmed by measuring TGA plots of polyaramid fiber and the binder. When a handsheet was prepared with a combination of organic and inorganic binder, the weight loss due to the binder was less since there was less organic binder. As expected, handsheets prepared with only inorganic binder did not show any decomposition at 350° C.

EXAMPLES 10–12

A slurry was made by blending 1.0 g polyaramid fiber to the 700 ml of deionized (DI) water. Activated alumina was then added to the above slurry under stirring. A retention aid and a binder were added to the slurry allowing fibers and adsorbent materials to bind together. In Examples 10–12, handsheets were prepared using combination of an acrylic latex binder and a polyethyleneglycol (PEG) binder from Aldrich Chemical and a retention aid. The type and quantity of retention aid and binders are presented in TABLE 3. The stock preparation was carried out using deionized water at 50° C. The stock was poured into the handsheet mold and water was drained by gravitational forces. The sheet thus formed was pressed by a roller press to remove the additional water. The sheet was then dried at 100° C. for about 5 min.

TABLE 3

Amount of retention aid and binders in Examples 10–12.

| Example | Sample Name | Retention Aid wt., g | Latex wt., g | PEG, wt., g |
| --- | --- | --- | --- | --- |
| 10 | Latex | 0.04 | 0.44 | 0.00 |
| 11 | Latex + PEG | 0.04 | 0.11 | 0.33 |
| 12 | PEG | 0.04 | 0.00 | 0.44 |

EXAMPLE 13

Thermogravimetric analysis (TGA) measurements for samples in Examples 10–12 were carried out on a Perkin Elmer Thermogravimetric Analyzer TGA7 in the flow of air with a flow rate of 2 liters per min. The temperature was raised at the rate of 2° C. per min to 300° C. and was held for 10 hours.

TABLE 4

Amount of retention aid and binders in Examples 10–12.

| Sample Name | Weight Loss, % |
| --- | --- |
| Latex | 12.8 |
| Latex + PEG | 15.5 |
| PEG | 17.8 |

It is clear that when lower temperature binder such as PEG is used in combination with a higher temperature binder or alone, a significantly higher amount of binder can be removed at lower temperatures.

Physical examination of the monoliths prepared according to this invention (organic+inorganic binder of Examples 3, 5 and 7 and latex+PEG binder of Example 11) and activated according to the teachings of this invention (removing most of the lower temperature binders while leaving most of the higher temperature binder) showed monoliths which were structurally strong and could be used effectively in adsorption processes. Also, adsorption kinetics of the monoliths prepared according to this invention were much faster compared to the monoliths in which little or no binder was removed during the monolith activation process. Based on kinetic measurements the monoliths of this invention are expected to be very useful in fast pressure and temperature swing adsorption processes.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

Having thus described the invention, what we claim is:

1. A process for removing lower temperature binders from a monolith structure containing a mixture of lower temperature and higher temperature binders comprising from about 50 to about 95 weight % lower temperature binders while activating the adsorbent in said monolith structure comprising heating said monolith structure to a temperature sufficient to remove substantially all of said lower temperature binder.

2. A process for fabricating a monolith adsorbent structure comprising the steps of: forming a slurry comprising water, fiber, adsorbent, retention aid and a mixture of lower and higher temperature binders wherein said mixture comprises from about 50 to about 95 weight % lower temperature binders; forming paper from said slurry; forming a monolith adsorbent structure from said paper; and heating said monolith adsorbent structure in the flow of a gas to a temperature sufficient to remove substantially all of said lower temperature binder.

3. A method of separating a first gaseous component from a gas mixture comprising a first gaseous component and a second gaseous component comprising:
   (a) passing the gaseous mixture into an adsorption zone containing a monolith adsorbent, wherein said monolith adsorbent containing a mixture of lower temperature and higher temperature binders comprising from about 50 to about 95 weight % lower temperature binders, wherein said monolith adsorbent has been heated to a temperature sufficient to remove substantially all of the lower temperature binder contained therein, and wherein said monolith adsorbent is capable of separating said first gaseous component from said second gaseous component; and
   (b) recovering the non-preferentially adsorbed gaseous component from said adsorption zone.

* * * * *